United States Patent
Murphy et al.

(10) Patent No.: US 11,599,799 B1
(45) Date of Patent: Mar. 7, 2023

(54) DIGITAL SIGNAL PROCESSING WITH NEURAL NETWORKS

(71) Applicant: Rockwell Collins, Inc., Cedar Rapids, IA (US)

(72) Inventors: Ryan M. Murphy, Marion, IA (US); Benjamin C. Barnett, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 808 days.

(21) Appl. No.: 16/573,113

(22) Filed: Sep. 17, 2019

(51) Int. Cl.
*G06N 3/10* (2006.01)
*G06N 3/08* (2006.01)
*H04L 12/28* (2006.01)

(52) U.S. Cl.
CPC ............... *G06N 3/10* (2013.01); *G06N 3/08* (2013.01); *H04L 12/2801* (2013.01)

(58) Field of Classification Search
CPC ......... G06N 3/10; G06N 3/08; H04L 12/2801
See application file for complete search history.

(56) References Cited

U.S. PATENT DOCUMENTS

| | | | |
|---|---|---|---|
| 11,150,327 B1 * | 10/2021 | Jiang | G01S 13/9027 |
| 11,218,498 B2 * | 1/2022 | Hajimirsadeghi | H04L 63/1425 |
| 11,228,379 B1 * | 1/2022 | O'Shea | H04B 17/3912 |
| 11,393,211 B2 * | 7/2022 | Varerkar | G06N 3/084 |
| 2015/0106306 A1 * | 4/2015 | Birdwell | G06N 3/0635 706/11 |
| 2016/0042271 A1 * | 2/2016 | Yoon | G06N 3/04 706/25 |
| 2016/0163310 A1 * | 6/2016 | Lee | G10L 15/19 704/232 |
| 2019/0065955 A1 * | 2/2019 | Ozcan | G06N 3/063 |
| 2019/0138900 A1 * | 5/2019 | Linares-Barranco | G06N 3/08 |
| 2019/0205737 A1 * | 7/2019 | Bleiweiss | G06N 20/00 |
| 2019/0228762 A1 * | 7/2019 | Wang | G06V 10/98 |
| 2020/0042857 A1 * | 2/2020 | Fang | G06N 3/08 |
| 2020/0250491 A1 * | 8/2020 | Peng | G06K 9/6263 |
| 2021/0168395 A1 * | 6/2021 | Cricri | H04N 19/103 |
| 2021/0183002 A1 * | 6/2021 | Sharma | G06T 1/20 |

FOREIGN PATENT DOCUMENTS

| | | |
|---|---|---|
| WO | 2018176000 A1 | 9/2018 |
| WO | 2019113063 A1 | 6/2019 |
| WO | 2019122271 A1 | 6/2019 |

* cited by examiner

*Primary Examiner* — Asghar H Bilgrami
(74) *Attorney, Agent, or Firm* — Suiter Swantz pc llo

(57) ABSTRACT

A computerized neural network training and testing environment trains and validates a neural network to produce outputs corresponding to a digital signal processing (DSP) algorithm. After validation and testing, the neural network is replicable in any processing environment, independent of device architecture. Such devices may also include a neural network having a reversed process flow to produce a digital signal corresponding to an inverse of the DSP algorithm.

15 Claims, 3 Drawing Sheets

DIGITAL SIGNAL PROCESSING WITH NEURAL NETWORKS

BACKGROUND

Digital signal processing (DSP), such as in modems, requires identifying a processing algorithm, testing the processing algorithm, converting the algorithm to device specific instructions, and testing each device. The overhead of converting and testing the algorithm for each device is onerous.

It would be advantageous if a methodology existed for producing device independent DSP algorithms.

SUMMARY

In one aspect, embodiments of the inventive concepts disclosed herein are directed to a computerized neural network training and testing environment to train a neural network to produce outputs corresponding to a digital signal processing (DSP) algorithm. After testing, the neural network is replicable in any processing environment.

In a further aspect, embodiments include a neural network having a reversed process flow to produce a digital signal corresponding to an inverse of the DSP algorithm.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
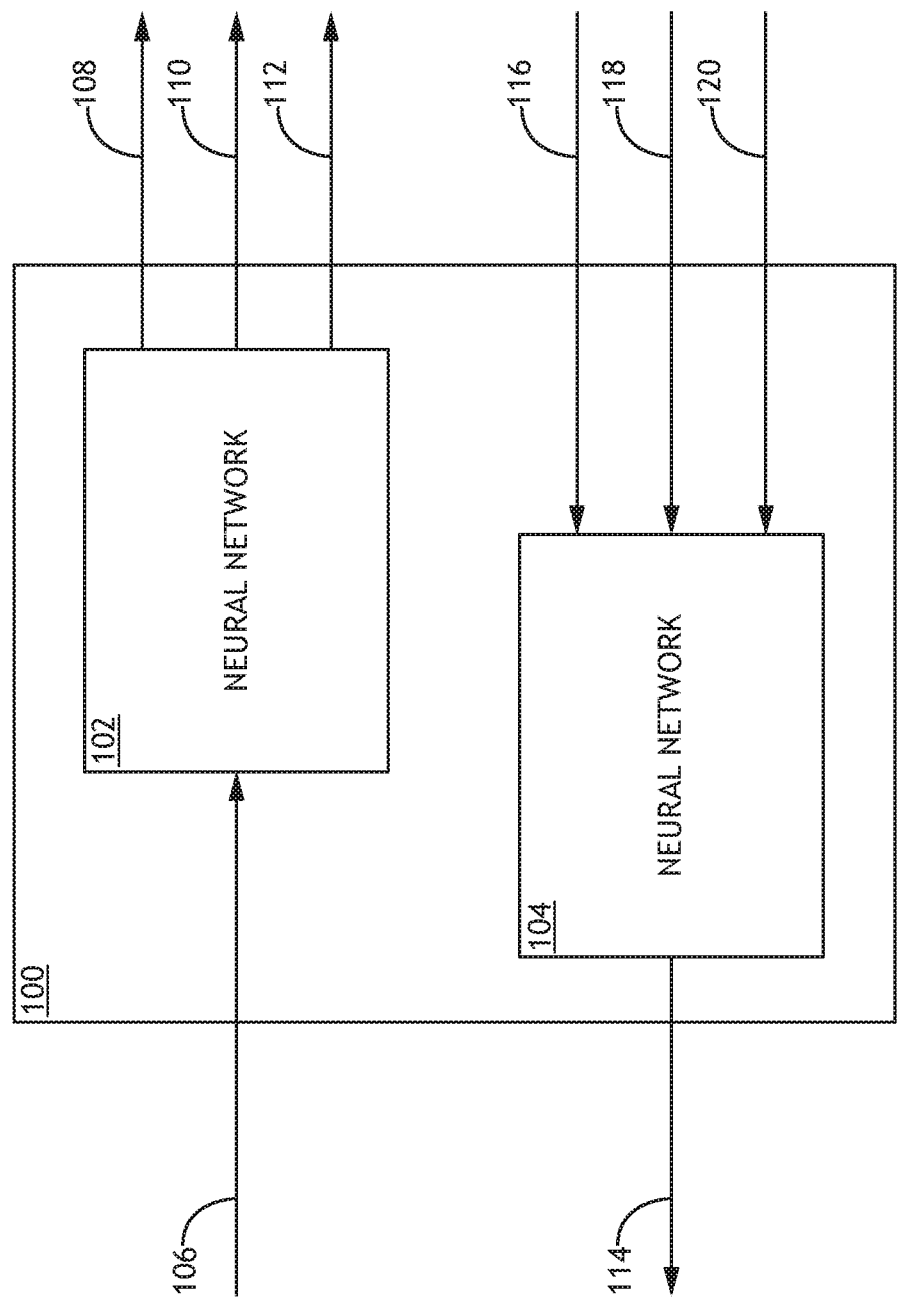
FIG. 1 shows a block diagram of an exemplary embodiment of a modem according to the inventive concepts disclosed here.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a computerized neural network training and testing environment to train a neural network to produce outputs corresponding to a digital signal processing (DSP) algorithm. After testing, the neural network is replicable in any processing environment.

Referring to FIG. 1, a block diagram of an exemplary embodiment of a processing environment 100 according to the inventive concepts disclosed here is shown. The processing environment 100 incudes at least one processor embodying a neural network 102 configured and trained to receive at east one digital signal 106 and produce one or more output signals 108, 110, 112. In at least one embodiment, the processing environment 100 comprises a computer system having a processor, memory for storing processor executable code, and a data storage device for storing training data sets and validation data sets. In another embodiment, the processing environment 100 may comprise a modem, either a test device configured for neural network training or a production device operable in a test mode.

Furthermore, the processing environment 100 may include a second neural network 104 configured and trained to receive one or more input signals 116, 118, 120 and produce one or more digital signals 114. The second neural network 104 may be configured by reversing the node configuration and weights from layer to layer as compared to the first neural network 102.

Figure 2:
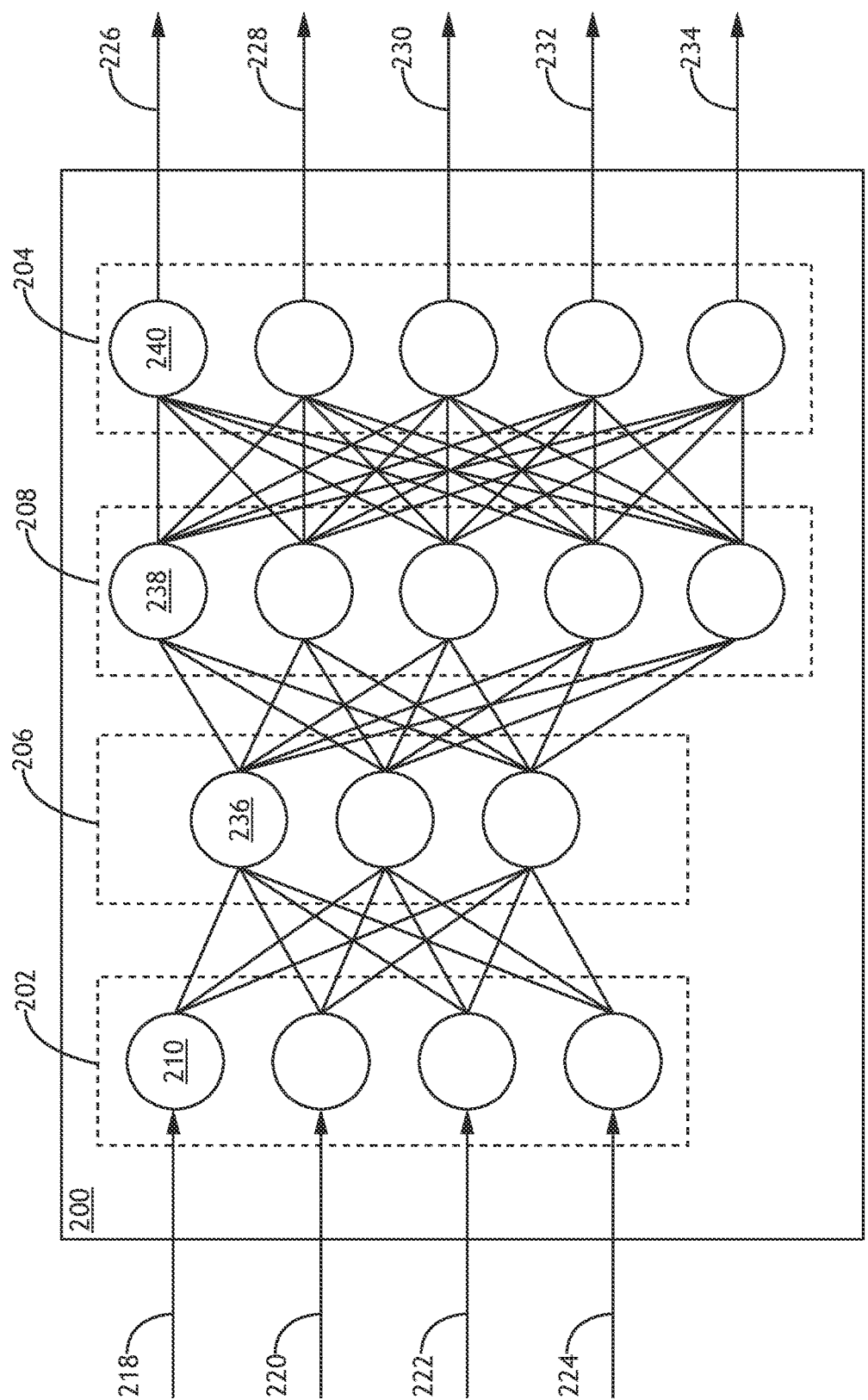
FIG. 2 shows a block diagram of a neural network according an exemplary embodiment of the inventive concepts disclosed herein.

Referring to FIG. 2, a block diagram of a neural network 200 according an exemplary embodiment of the inventive concepts disclosed herein is shown. The neural network 200 comprises an input layer 202, and output layer 204, and a plurality of internal layers 206, 208. Each layer comprises a plurality of neurons or nodes 210, 236, 238, 240. In the input layer 202, each node 210 receives one or more inputs 218, 220, 222, 224 corresponding to a digital signal and produces and output 212 based on an activation function unique to each node 210 in the input layer 202. An activation function may be a Hyperbolic tangent function, a linear output function, and/or a logistic function, or some combination thereof, and different nodes 210, 236, 238, 240 may utilize different types of activation functions. In at least one embodiment, such activation function comprises the sum of each input multiplied by an synaptic weight. The output 212 may comprise a real value with a defined range or a Boolean value if the activation function surpasses a defined threshold. Such ranges and thresholds may be defined during a training process. Furthermore, the synaptic weights are determined during the training process.

Outputs 212 from each of the nodes 210 in the input layer 202 are passed to each node 236 in a first intermediate layer 206. The process continues through any number of intermediate layers 206, 208 with each intermediate layer node 236, 238 having a unique set of synaptic weights corresponding to each input 212, 214 from the previous intermediate layer 206, 208. It is envisioned that certain intermediate layer nodes 236, 238 may produce a real value with a range while other intermediated layer nodes 236, 238 may produce a Boolean value. Furthermore, it is envisioned that certain intermediate layer nodes 236, 238 may utilize a weighted input summation methodology while others utilize a weighted input product methodology. It is further envisioned that synaptic weight may correspond to bit shifting of the corresponding inputs 212, 214, 216.

An output layer 204 including one or more output nodes 240 receives the outputs 216 from each of the nodes 238 in the previous intermediate layer 208. Each output node 240 produces a final output 226, 228, 230, 232, 234 via processing the previous layer inputs 216. Such outputs may comprise separate components of an interleaved input signal, bits for delivery to a register, or other digital output based on a n input signal and DSP algorithm.

In at least one embodiment, each node 210, 236, 238, 240 in any layer 202, 206, 208, 204 may include a node weight to boot the output value of that node 210, 236, 238, 240 independent of the weighting applied to the output of that node 210, 236, 238, 240 in subsequent layers 204, 206, 208. It may be appreciated that certain synaptic weights may be zero to effectively isolate a node 210, 236, 238, 240 from an input 212, 214, 216, from one or more nodes 210, 236, 238 in a previous layer, or an initial input 218, 220, 222, 224.

In at least one embodiment, the number of processing layers 202, 204, 206, 208 may be constrained at a design phase based on a desired data throughput rate. Furthermore, multiple processors and multiple processing threads may facilitate simultaneous calculations of nodes 210, 236, 238, 240 within each processing layers 202, 204, 206, 208.

Layers 202, 204, 206, 208 may be organized in a feed forward architecture where nodes 210, 236, 238, 240 only receive inputs from the previous layer 202, 204, 206 and deliver outputs only to the immediately subsequent layer 204, 206, 208, or a recurrent architecture, or some combination thereof.

Figure 3:
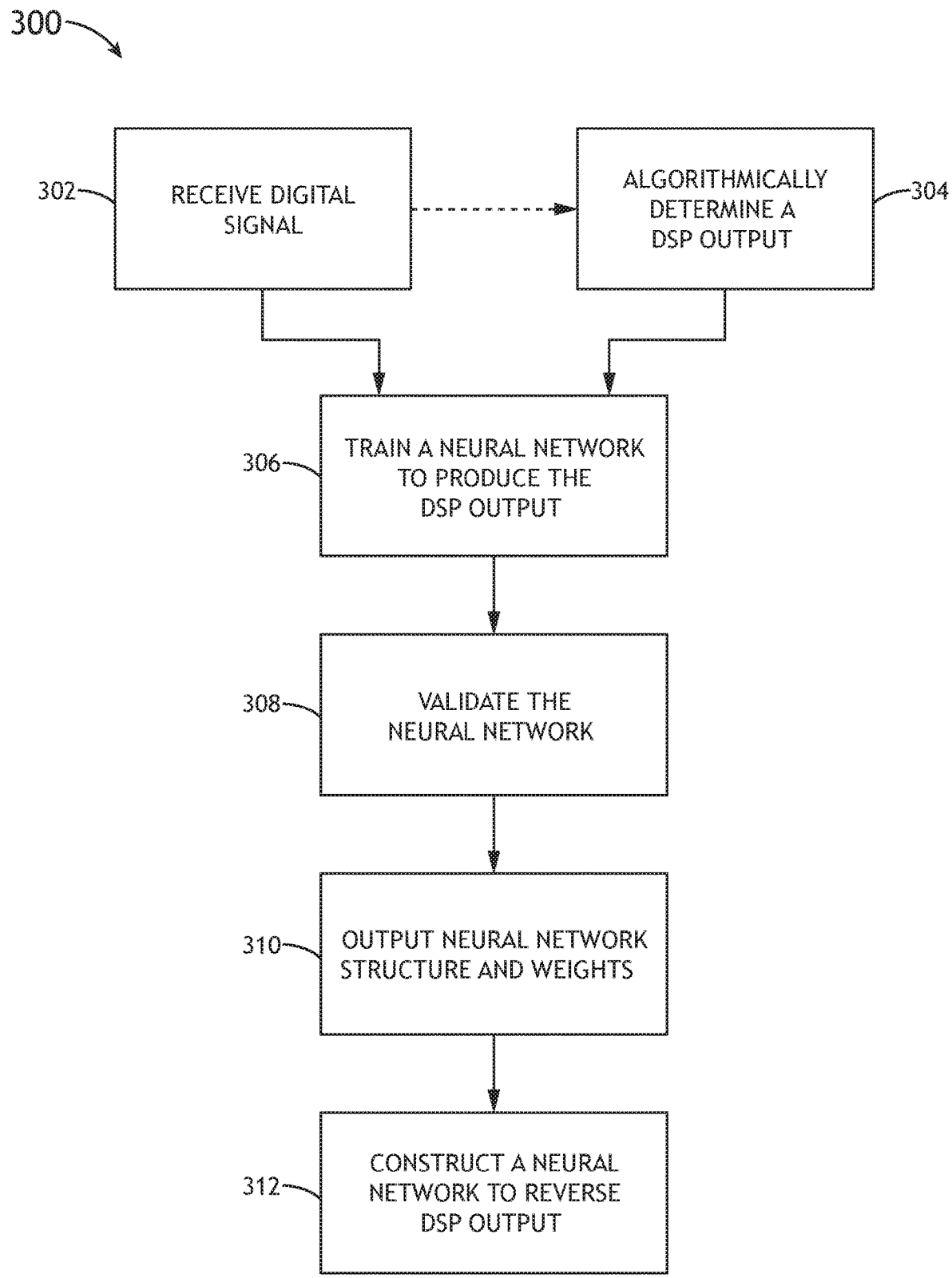
FIG. 3 shows a flowchart of a method for training a neural network according the inventive concepts disclosed here.

Referring to FIG. 3, a flowchart 300 of a method for training a neural network according the inventive concepts disclosed here is shown. In a training environment, or alternatively in a production device paced in a training mode, a processor receives 302 a digital signal and corresponding DSP output based on a particular algorithm. Alternatively, the processor may receive 302 the digital signal and algorithmically calculate 304 the DSP output. A neural network is designed and iteratively trained 306 to produce the DSP output from the digital signal.

During supervised training, a designer may adjust one or more input biases or synaptic weights of the nodes in one or more processing layers of the neural network according to a loss function that defines an expected performance. Alternatively, or in addition, the designer may utilize certain training data sets, categorized as selection data sets, to choose a predictive model for use by the neural networks. During unsupervised training, the processor adjusts one or more input biases or synaptic weights of the nodes in one or more processing layers according to a training algorithm. In at least one embodiment, where the training data sets include both stable and unstable outputs, the training algorithm may comprise a first component to minimize disparity with approaches labeled "stable" and a second component to prevent close approximation with approaches labeled "unstable." A person skilled in the art may appreciate that maximizing disparity with unstable approaches may be undesirable until the neural network has been sufficiently trained or designed so as to define constraints of normal operation within which both stable and unstable approaches are conceivable.

In at least one embodiment, training data sets may be categorized based on a defined level of stability or instability, and provided in ascending order of convergence such that the disparities between stable and unstable approaches diminish during training and necessary adjustments presumably become smaller over time according to first and second order deviations of the corresponding loss function. The loss function may define error according to mean square, root mean square, normalized square, a weighted square, or some combination thereof, where the gradient of the loss function may be calculated via backpropagation.

In at least one embodiment, the adjustments may be based on minimizing multidimensional loss functions, such as through first or second order derivatives. Alternatively, or in addition, the designers may iteratively simplify the process to focus on a single-dimension loss function at one time. Training algorithms suitable for embodiments of the present disclosure may include, but are not limited to, gradient descent where the loss function is iteratively limited to a single variable, Conjugate gradient, Newton's method, Quasi-Newton method, Levenberg-Marquardt, etc.

After training 306, the neural network structure is validated 308 via a validation data set. In some embodiments, the training data set and validation data set may comprise every possible combination of input bits and corresponding outputs. Furthermore, the training data set and validation data set may include input signals with various levels of noise. Once the neural network structure is validated (including synaptic weights for each node at each layer), the structure is output 310 as a data structure that may be replicated in any processing environment.

In at least one embodiment, where bidirectional processing is desirable, the processing environment may construct a data structure corresponding to a neural network to reverse the process steps by reversing the order of layers and synaptic weights in corresponding nodes. Such data structure may require validation and testing.

Realizing legacy DSP algorithms and waveforms via the methods and devices herein allow processing with different processor technologies without onerous validation and testing of algorithmic processes every time.

While the foregoing descriptions have been in the context of an autonomous landing system, it is contemplated that the systems and methods could also be implemented as a pilot monitoring tool. In such an implementation, the flight commands generated by the system would not be implemented directly, but would be compared to actual inputs from a pilot to gauge such pilot's attentiveness and decision making. Such system may include alarm features to alert the pilot of a dangerous deviation from what the system considers to be the appropriate response.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor;
    memory connected to the processor for storing processor executable code to configure the at least one processor to:
        instantiate a neural network comprising:
            an input layer comprising at least one node, the at least one node configured to receive a digital signal input;
            at least one intermediate layer, each comprising at least one node, each node configured to receive outputs from nodes in previous layers; and
            an output layer comprising at least one node, the at least one node configured to receive outputs from nodes in a last intermediate layer and produce one or more output signals;
        receive a training data set comprising a plurality of digital signals and outputs, each output corresponding to a digital signal processing (DSP) algorithm output when applied to the associated digital signal;
        iteratively adjust at least one of a node composition of one or more layers or a synaptic weight of one or more nodes in at least one layer based on a training algorithm;
        convert the neural network to a data structure representing the layer structure, node composition, and synaptic weights of the neural network;
        output the data structure; and
        construct a reversed neural network data structure having a reversed process flow corresponding to the data structure wherein a layer order and synaptic weights are reversed.

2. The computer apparatus of claim 1, wherein the processor executable code further configures the at least one processor to produce the training data set by:
    iteratively generating digital signals;
    applying the DSP algorithm to the iteratively generated digital signals to produce a corresponding set of outputs; and
    applying various levels of noise to the corresponding set of outputs.

3. The computer apparatus of claim 1, wherein the iteratively generated digital signals comprise every possible digital input for a defined digital register.

4. The computer apparatus of claim 1, wherein the processor executable code further configures the at least one processor to:
    receive a validation data set comprising a plurality of digital signals and expected outputs, each output corresponding to a DSP algorithm output when applied to the associated digital signal;
    iteratively supply digital signals from the validation data set to the neural network; and
    verify that outputs from the neural network correspond to the expected outputs from the validation data set.

5. The computer apparatus of claim 4, wherein the processor executable code further configures the at least one processor to apply various levels of noise to the digital signals of the validation data set.

6. The computer apparatus of claim 1, wherein the processor executable code further configures the at least one processor to distribute the neural network to a plurality of disparate processing environments, each utilizing a distinct processing element.

7. A method comprising:
    instantiating a neural network comprising:
        an input layer comprising at least one node, the at least one node configured to receive a digital signal input;
        at least one intermediate layer, each comprising at least one node, each node configured to receive outputs from nodes in previous layers; and
        an output layer comprising at least one node, the at least one node configured to receive outputs from nodes in a last intermediate layer and produce one or more output signals;
    instantiating a reversed neural network having a reversed process flow corresponding to the neural network wherein a layer order and synaptic weights are reversed;
    receiving a digital signal;
    processing the digital signal through the neural network to produce an output corresponding to a digital signal processing (DSP) algorithm;
    receiving a signal; and
    processing the signal via the reversed neural network to produce a digital signal corresponding to a reversed DSP algorithm.

8. The method of claim 7, wherein instantiating the neural network comprises:
    receiving a data structure corresponding to a layer structure, node composition, and synaptic weights of the neural network; and
    instantiating the input layer, at least one intermediate layer, and output layer according to the data structure.

9. The method of claim 7, further comprising:
    iteratively receiving digital signals; and
    iteratively processing the digital signals via the neural network, wherein the iterative processing steps are spaced by a number of clock cycles such that a subsequent digital signal is applied to the input layer before a prior digital signal reaches the output layer.

10. The method of claim 9, further comprising:
storing each iteratively received digital signal;
storing a corresponding output to each iteratively received digital signal; and
validating the stored iteratively received digital signals and corresponding outputs via the DSP algorithm.

11. The method of claim 10, further comprising training a subsequent neural network via the validated stored iteratively received digital signal and corresponding output.

12. A modem comprising:
at least one processor;
memory connected to the processor for storing processor executable code to configure the at least one processor to:
instantiate a neural network by receiving and converting a data structure representing a layer structure, node composition, and set of synaptic weights, the neural network comprising:
an input layer comprising at least one node, the at least one node configured to receive a digital signal input;
at least one intermediate layer, each comprising at least one node, each node configured to receive outputs from nodes in previous layers; and
an output layer comprising at least one node, the at least one node configured to receive outputs from nodes in a last intermediate layer and produce one or more output signals;
instantiate a reversed neural network based on a data structure having a reversed process flow as compared to the data structure wherein a layer order and synaptic weights are reversed;
receive a digital signal; and
process the digital signal through the neural network to produce an output corresponding to a digital signal processing (DSP) algorithm.

13. The modem of claim 12, wherein the processor executable code further configures the at least one processor to enter a training mode wherein the neural network is trained according to a training algorithm and a training data set.

14. The modem of claim 12, wherein:
the processor executable code further configures the at least one processor to:
iteratively receive digital signals; and
iteratively process the digital signals via the neural network; and
the iterative processing steps are spaced such that a subsequent digital signal is applied to the input layer before a prior digital signal reaches the output layer.

15. The modem of claim 14, further comprising:
storing each iteratively received digital signal;
storing a corresponding output to each iteratively received digital signal; and
validating a set of the stored iteratively received digital signal and corresponding outputs via the DSP algorithm.

* * * * *